United States Patent
Yahata

(10) Patent No.: US 9,644,996 B2
(45) Date of Patent: May 9, 2017

(54) CONTROLLER FOR AIR-CONDITIONING APPARATUS

(71) Applicant: Naoki Yahata, Tokyo (JP)

(72) Inventor: Naoki Yahata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 100 days.

(21) Appl. No.: 13/850,381

(22) Filed: Mar. 26, 2013

(65) Prior Publication Data

US 2014/0146514 A1    May 29, 2014

(30) Foreign Application Priority Data

Nov. 29, 2012 (JP) .................................. 2012-261299

(51) Int. Cl.
*G01D 11/28* (2006.01)
(52) U.S. Cl.
CPC ..................................... *G01D 11/28* (2013.01)
(58) Field of Classification Search
CPC .............................. G01D 11/28; F24F 11/0012
USPC ......................................................... 362/23.16
See application file for complete search history.

(56) References Cited

U.S. PATENT DOCUMENTS

2006/0126343 A1* 6/2006 Hsieh et al. ................... 362/327
2007/0157745 A1* 7/2007 Takato .................... G01D 11/28 73/866.3
2008/0062686 A1* 3/2008 Hoelen et al. ................ 362/240
2009/0290350 A1* 11/2009 Zhao et al. .................... 362/253
2010/0060479 A1* 3/2010 Salter ........................... 340/870.4

FOREIGN PATENT DOCUMENTS

| JP | 2002-100259 A | 4/2002 |
| JP | 2005-353491 A | 12/2005 |
| JP | 2009-036417 A | 2/2009 |
| JP | 2009-229009 A | 10/2009 |
| JP | 2009-288601 A | 12/2009 |

OTHER PUBLICATIONS

Office Action issued Mar. 22, 2016 in the corresponding JP application No. 2012-261299 (with English translation).

* cited by examiner

*Primary Examiner* — Nimeshkumar Patel
*Assistant Examiner* — Jacob R Stern
(74) *Attorney, Agent, or Firm* — Posz Law Group, PLC

(57) ABSTRACT

Obtained is a controller for an air-conditioning apparatus with which indication by light can be effectively performed. The controller includes a light source 21 capable of emitting light in a plurality of colors and a light guiding member 22 that diffuses the light emitted from the light source 21 so as to increase an indication area, thereby performing light indication in an indication region 22*a*. By increasing the light indication area, light indication can be effectively performed, and accordingly, visual recognition by the user can be easily performed.

15 Claims, 2 Drawing Sheets

CONTROLLER FOR AIR-CONDITIONING APPARATUS

TECHNICAL FIELD

The present invention relates to a controller for an air-conditioning apparatus. In particular, the present invention relates to indication performed by a wall-mountable controller.

BACKGROUND ART

In many cases, air-conditioning apparatuses (air-conditioning devices) are installed at a high position such as, for example, a ceiling in a room. Thus, in order for the users to easily perform operations of air-conditioning apparatuses, display of states of the air-conditioning apparatuses, and the like, controllers (wall-mountable controllers for an air-conditioning apparatus) are often installed at positions on walls, at which the user can easily perform operations and the like.

In some cases, operating states and the like of an air-conditioning apparatus are indicated to the user by characters, numerals, and the like displayed on a display device. However, in other cases, it is sufficient that the operating states or the like of an air-conditioning apparatus be generally indicated to the user instead of detailed indication. For this purpose, in some conventional wall-mountable controllers for an air-conditioning apparatus, an operating state indication region, which performs light indication using light emitting diodes (LEDs) or the like, is provided in an operation surface of the controller. In such a controller, the user can check operating states by observing, for example, indicators representing operating states (operating/stopped/in an abnormal state) such as turned on/turned off/blinking LEDs or the like (for example, see Patent Literature 1). Indication by light can increase an area in which the user can be visually notified of operating states or the like compared to indication using display of characters or the like.

CITATION LIST

Patent Literature

Patent Literature 1 Japanese Unexamined Patent Application Publication No. 2009-229009 (FIG. 1)

SUMMARY OF INVENTION

Technical Problem

However, as is the case with a controller for an air-conditioning apparatus as described in the above-described Patent Literature 1, when the indication area of an operating state indication region is small, the amount of light by which the operating state indication region is illuminated is decreased. Thus, an area in which the state of indication can be checked is decreased. Furthermore, the operating state indication region is provided, for example, on an operation surface that faces an indoor side. Thus, when, for example, ambient light (such as light from a fluorescent lamp) is directly incident upon the operation surface, the light from the operating state indication region is comparatively weakened, and accordingly, the visibility of the operating state indication region may be degraded.

The present invention is proposed in order to address the above described problems. An object of the present invention is to obtain a controller for an air-conditioning apparatus with which indication by light can be effectively performed.

Solution to Problem

A controller for an air-conditioning apparatus according to the present invention includes light emitting means and a light guiding member that has an indication region having a larger indication area than the area of the light emitting means. The light guiding member diffuses light emitted from the light emitting means so as to perform light indication in the indication region.

Advantageous Effects of Invention

In the wall-mountable controller for an air-conditioning apparatus according to the present invention, the light guiding member diffuses light emitted from the light emitting means so as to perform light indication in the indication region. Thus, the light indication area can be increased even when, for example, the number of light emitting means is small, and a controller for an air-conditioning apparatus, with which visual recognition by the user can be easily performed, can be obtained.

DESCRIPTION OF EMBODIMENT

Embodiment

Figure 1:
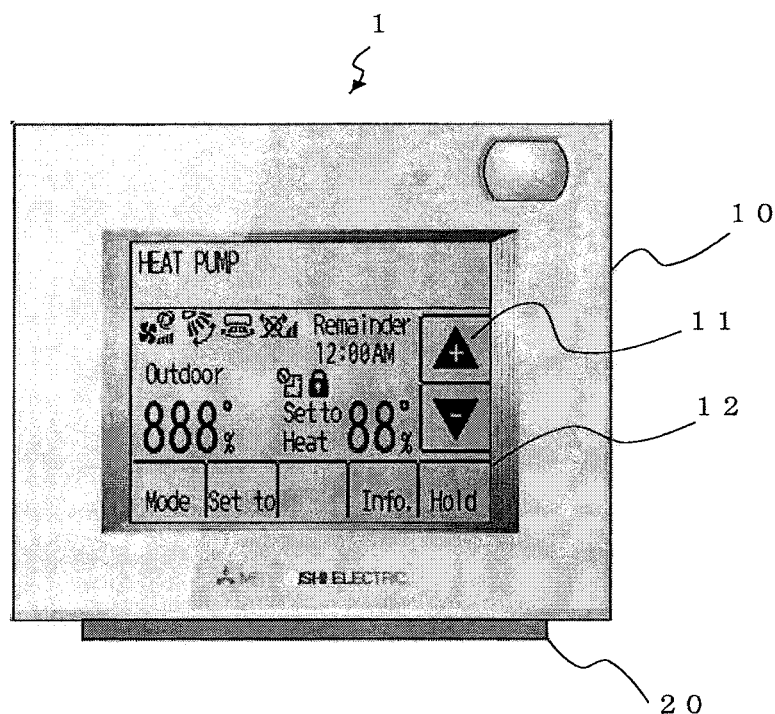
FIG. 1 illustrates the appearance of a controller for an air-conditioning apparatus 1 (controller 1) according to Embodiment of the present invention.

FIG. 1 illustrates the appearance of a controller for an air-conditioning apparatus 1 (hereafter referred to as "controller 1") according to Embodiment of the present invention. The controller 1 according to Embodiment is a wall-mountable controller. Here, in Embodiment, upper, lower, left, and right directions are defined with respect to an operation surface illustrated in FIG. 1.

The controller 1 according to Embodiment includes a controller main body 10 and a light indicator unit 20. The controller main body 10 includes a main display 11. The main display 11 displays, for example, the functions, operating states, and the like of the air-conditioning apparatus and the like using characters, numerals, signs, pictures (icons, pictograms, and pictorial representation using characters), and the like. The main display 11 can also display virtual buttons or the like, with which the user inputs instructions in conjunction with a touch panel section 12. The touch panel section 12 serves as an instruction input means, with which instructions input by the user corresponding to a display screen of the main display 11 is transmitted to a controller (not shown).

The light indicator unit 20 serving as light indicating means provides notification of information about the air-conditioning apparatus such as operating mode (heating, cooling, dehumidification, and the like), operating states (operating, in an abnormal state, stopped), and temperatures or the like in accordance with detection by a temperature sensor or the like (not shown) using set colors and the like. The light indicator unit 20 may have, for example, a blinking mode in addition to a continuously lighting mode as a mode of indication. In the controller 1 according to Embodiment, the light indicator unit 20 is housed in the controller main body 10 with part thereof as an indication region 22a exposed from a lower surface of the controller main body 10 to the outside of the controller main body 10. This defines the design of the controller 1. Thus, the light indicator unit 20 appears at a position on a lower side of the controller main body 10 when seen in a direction facing the operation surface of the controller main body 10. When the light indicator unit 20 is located on an upper surface or the operation surface of the controller main body 10, indication performed by the light indicator unit 20 is not easily recognized by the user due to ambient light. In order to prevent ambient light from being incident upon the light indicator unit 20, the light indicator unit 20 is exposed from the lower surface of the controller main body 10 so that the light indicator unit 20 is shaded by the controller main body 10. Here, although not particularly limited to this, the length of the indication region 22a in the left-right direction (lateral width) is desirably set so as not to exceed the width of the controller main body 10 for the purposes of defining the design of the controller 1, utilizing the shadow of the controller main body 10, and the like.

Figure 2:
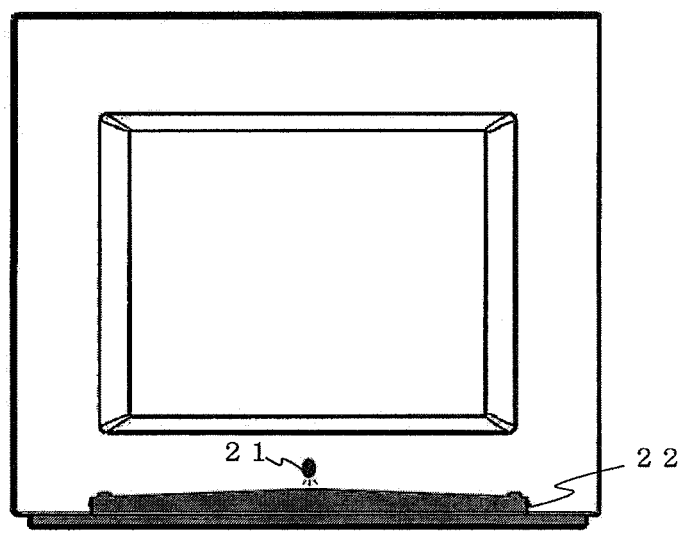
FIG. 2 illustrates the structure of a light indicator unit 20 according to Embodiment of the present invention.
Figure 3A:
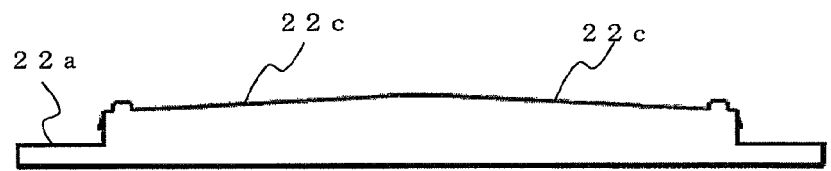
FIG. 3A is a front view that illustrates the structure of a light guiding member 22 according to Embodiment of the present invention.
Figure 3B:
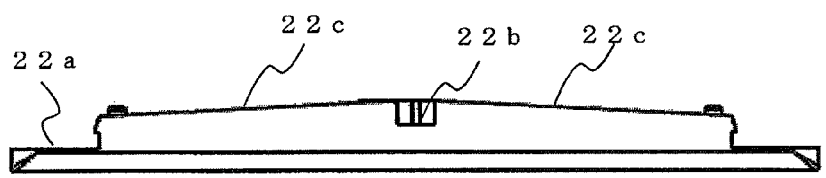
FIG. 3B is a back view that illustrates the structure of a light guiding member 22 according to Embodiment of the present invention.
Figure 3C:
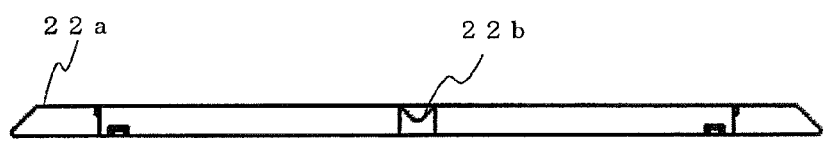
FIG. 3C is a top view that illustrates the structure of a light guiding member 22 according to Embodiment of the present invention.
Figure 3D:
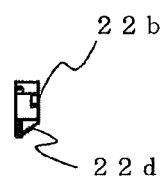
FIG. 3D is a side view that illustrates the structure of a light guiding member 22 according to Embodiment of the present invention.

FIG. 2 illustrates the structure of the light indicator unit 20 according to Embodiment of the present invention. FIG. 2 also illustrates components housed in the controller main body 10 for describing the positional relationships. The light indicator unit 20 according to Embodiment is described more in detail below. The light indicator unit 20 includes a light source 21 and a light guiding member 22.

The light source 21 is mounted on a control substrate (not shown) housed in the controller main body 10. In Embodiment, three-color LEDs are used to permit indication in a plurality of colors (for example, full-color indication). As the number of colors used for indication increases, the amount of information to be indicated increases. The light source 21 is not limited to, for example, three-color LEDs.

FIG. 3 includes views that illustrate the structure of the light guiding member 22 according to Embodiment of the present invention. FIG. 3A illustrates the light guiding member 22 seen from a position opposing the operation surface (front view). FIG. 3B is a rear view of the light guiding member 22. FIG. 3C is a top view of the light guiding member 22. FIG. 3D is a side view (right side view) of the light guiding member 22. The light guiding member 22 is formed of, for example, acrylic (acrylic resin) having a high transparency and allowing visual light to be transmitted therethrough. Light emitted from the light source 21 is guided toward the indication region 22a exposed to outside the controller main body 10 while being diffused so as to illuminate the indication region 22a. By increasing the area of the indication region 22a, a lighting area can be increased while the number of LEDs used in the light source 21 is reduced. A light guiding V-cut 22b guides, when the light emitted from the light source 21 that faces downward is incident upon the light guiding V-cut, the light in the left-right directions of the light guiding member 22. Light guiding inclinations 22c guide the light having been guided by the light guiding V-cut 22b toward the indication region 22a located on the lower side. Lower light guiding inclinations 22d guide, when the light emitted from the light source 21 is incident upon the lower light guiding inclinations 22d, the light toward the operation surface side. Thus, light does not leak to unnecessary portions and the amount of light directed toward the operation surface (front surface) side can be increased. Here, although not particularly limited this, reflecting members may be attached to the light guiding inclinations 22c and the lower light guiding inclinations 22d using tape or the like so as to increase reflectance.

As described above, with the controller 1 according to Embodiment, the light guiding member 22 diffuses light emitted from the light source 21 so as to perform light indication in the indication region 22a. Thus, the light indication area can be increased. This can increase, for example, an area in which the user can recognize indication, thereby allowing effective light indication to be performed.

Furthermore, the indication region 22a of the light indicator unit 20 is provided such that the indication region 22a protrudes from the lower surface of the controller main body 10. Thus, because of the shadow of the controller main body 10, ambient light is not directly incident upon the indication region 22a. This can prevent the visibility of the light indicator unit 20 from being degraded.

REFERENCE SIGNS LIST 1 controller for an air-conditioning apparatus (controller), 10 controller main body, 11 main display, 12 touch panel section, 20 light indicator unit, 21 light source, 22 light guiding member, 22a indication region, 22b light guiding V-cut, 22c light guiding inclination, and 22d lower light guiding inclination.

The invention claimed is:

1. A controller for an air-conditioning apparatus, the controller comprising:
 a light source;
 a light guiding member that has an indication region having a larger indication area than the area of the light source, the light guiding member diffusing light emitted from the light source so as to perform light indication in the indication region; and
 a controller main body that shades the indication region and that includes a lower surface, an operation surface different from the lower surface, and an instruction input portion disposed on the operation surface, wherein
 the light guiding member is located at a lower side of the controller main body, is disposed in the controller main body such that the indication region protrudes past the outside of the controller main body from the lower surface of the controller main body, includes a flat bottom edge that linearly extends along the controller main body, and includes a V-cut that laterally spread light emitted from the light source toward the indication region side of the lower surface of the controller main body.

2. The controller of claim 1, wherein
 the light guiding member is formed of a material that allows visible light to be transmitted therethrough.

3. The controller of claim 1, wherein
 the light source is capable of emitting light in a plurality of colors.

4. The controller of claim 1, wherein
the light guiding member is formed of a material that allows visible light to be transmitted therethrough, the light guiding member causing the light emitted from the light source to be reflected in the light guiding member so as to guide the light to the indication region.

5. The controller of claim 1, wherein
the light source is capable of emitting light in a plurality of colors.

6. The controller of claim 2, wherein
the light source is capable of emitting light in a plurality of colors.

7. The controller of claim 1, wherein the V-cut reflects light in only the left-right directions.

8. The controller of claim 1, further comprising light guiding inclinations that are attached to the light guiding member, and that guide reflected light from the V-cut toward the indication region.

9. The controller of claim 8, wherein the light guiding inclinations further include reflecting members.

10. The controller of claim 1, wherein the light guiding member further includes light guiding inclinations that guide the light guided by the V-cut toward a lower side of the light guiding member.

11. The controller of claim 10, wherein the light guiding member further includes lower light guiding inclinations that guide the light guided by the light guiding inclinations toward the operation surface.

12. The controller of claim 1, wherein the light source is disposed substantially at a center of the control main body and to face the V-cut.

13. The controller of claim 1, wherein the controller is mounted on a wall.

14. The controller of claim 1, wherein
the light guiding member has a center portion,
the V-cut is located in the center portion of the light guiding member and is configured to laterally spread light emitted from the light source, and
the light guiding member further includes
upper light guiding inclinations that are configured to guide light laterally spread by the V-cut toward the indication region of the light guiding member, and
lower light guiding inclinations that are located closer to the flat bottom edge than the upper light guiding inclinations, and that are configured to guide light toward the operation surface of the controller main body.

15. The controller of claim 14, wherein
the light guiding member includes an upper portion, and a lower portion connected to the upper portion,
the upper portion is located within the controller main body, has an upper portion width, and includes the V-cut and the upper light guiding inclinations, and
the lower portion extends past the controller main body, has a lower portion width that is greater than the upper portion, and includes the indication region and the lower light guiding inclinations.

\* \* \* \* \*